United States Patent

Inoue et al.

[11] Patent Number: 5,415,907
[45] Date of Patent: May 16, 1995

[54] INHIBITOR PARCEL AND METHOD FOR PRESERVING ELECTRONIC DEVICES OR ELECTRONIC PARTS

[75] Inventors: Yoshiaki Inoue; Shigeru Murabayashi; Yoshio Yoshikawa; Takeshi Nagasaka; Yoshihiko Harima; Isamu Yoshino, all of Tokyo, Japan

[73] Assignee: Mitsubishi Gas Chemical Company, Inc., Tokyo, Japan

[21] Appl. No.: 599,525

[22] Filed: Oct. 18, 1990

[30] Foreign Application Priority Data

Oct. 23, 1989 [JP] Japan ................................. 1-273727
Oct. 23, 1989 [JP] Japan ................................. 1-273728
Dec. 8, 1989 [JP] Japan ................................. 1-319250
Dec. 15, 1989 [JP] Japan ................................. 1-323887

[51] Int. Cl.⁶ ................. B65D 81/26; F17C 11/00; B29D 22/00; B32B 3/00
[52] U.S. Cl. .................. 428/36.2; 428/68; 428/72; 428/166; 428/913; 428/286; 428/287; 206/204; 206/484.2
[58] Field of Search ............. 206/204, 484.2; 428/68, 428/913, 72, 103, 36.2, 166

[56] References Cited

U.S. PATENT DOCUMENTS

| | | | |
|---|---|---|---|
| 4,487,791 | 12/1984 | Komatsu et al. ............. | 428/35 |
| 4,579,223 | 4/1986 | Otsuka et al. . | |
| 4,856,650 | 8/1989 | Inoue ......................... | 206/204 |

FOREIGN PATENT DOCUMENTS

| | | |
|---|---|---|
| 0268848 | 6/1988 | European Pat. Off. . |
| 0269410 | 6/1988 | European Pat. Off. . |
| 56-153788 | 11/1981 | Japan . |
| 57-4203 | 1/1982 | Japan . |
| 62-40880 | 8/1987 | Japan . |
| 63-198962 | 8/1988 | Japan . |
| 64-67252 | 3/1989 | Japan . |
| 1-67252 | 5/1989 | Japan . |
| 1-139370 | 5/1989 | Japan . |

OTHER PUBLICATIONS

Abstract: English Translation of Japanese Patent Kokai No. 1-139370 Dated: May 31, 1989.
Abstract: English Translation of Japanese Patent Kokai No. 63-198962 Dated: Aug. 17, 1988.
Abstract: English Translation of Japanese Patent Kokai No. 57-4203 Dated: Jan. 9, 1982.

*Primary Examiner*—George F. Lesmes
*Assistant Examiner*—Terrel Morris
*Attorney, Agent, or Firm*—Armstrong, Westerman, Hattori, McLeland & Naughton

[57] ABSTRACT

Disclosed are an inhibitor parcel including (a) a composition including an unsaturated fatty acid compound as its main ingredient and (b) a permeable diffusing-parcelling material prepared by laminating and bonding an oxygen-permeable resin layer onto one side of a base sheet made of a fibrous material and an adhesive or onto one adhesive-coating side of a base sheet made of a fibrous material, then laminating and bonding thereonto an oxygen-permeable resin layer and laminating and bonding a porous film of low softening point resin or a low softening point nonwoven fabric onto the other side of the base sheet, the permeable diffusing-parcelling material (b) having an oxygen permeability of $10^4$ to $10^6$ ml/m². Atm. Day and a (water vapor permeability/oxygen permeability) ratio of 0.02 [H₂O mg.Atm/O₂ ml] or above at 25° C. at a relative humidity of 50% and the composition (a) being parcelled by the permeable diffusing-parcelling material (b) and an inhibitor parcel for use in electronic devices and electronic parts which includes the inhibitor parcel and a method for preserving electronic devices and electronic parts using the inhibitor parcel.

9 Claims, 1 Drawing Sheet

INHIBITOR PARCEL AND METHOD FOR PRESERVING ELECTRONIC DEVICES OR ELECTRONIC PARTS

BACKGROUND OF THE INVENTION

This invention relates to a parcel containing an inhibitor (hereinafter referred to as "inhibitor parcel"), and more particularly to an inhibitor parcel used for transporting or preserving metallic, electronic and semiconductor products, devices, parts and the like, as well as to a method for preserving metallic, electronic and semiconductor products, devices, parts and the like by the use of said inhibitor parcel and parcelled articles used for their preservation.

Further, this invention relates also to a combined use of a sheet-form drier in the abovementioned method for preservation and the abovementioned parcel. Furthermore, this invention relates also to the above-mentioned inhibitor which does not evolve heat rapidly and is safe and easy to handle even if allowed to stand in the presence of air before or after its use. In this specification, the inhibitor parcel may, at times, be simply referred to as "inhibitor".

In the preservation of copper, silver, aluminum and the like used in electronic devices or electronic parts, the rusting or corrosion caused by water, oxygen, acidic gases, metal halides and the like is the most important problem.

A semiconductor is produced by plating silver or gold onto a thin plate of copper alloy or iron-nickel alloy to form a lead frame, bonding IC chips thereto by the use of an adhesive, connecting the IC chips to the lead frame with gold wires, and thereafter sealing the whole with a resin.

When the lead frame is exposed to air, however, its alloy surface becomes rusty. As such, the use of silver- or gold-plating is impracticable and solderability to a printed base deteriorates. Further, aluminum is used in IC chips as a wiring elementary material, and the aluminum is rusted by the acidic gases and metallic halides vaporized from the adhesive or sealing material and the water and oxygen present in the atmospheric air, which causes breakage of wirings, etc.

As methods for preventing these rusting phenomena, the following methods have been known hitherto.

(1) Shortening of preservation period:

In the production of semiconductors, various steps of production are usually carried out at different places. If the periods of time necessary for transportation between different places and storage in warehouses are shortened as much as possible, rusting may be prevented. However, this method is disadvantageous in that the production cannot be designed intentionally and excessive equipments and staffs must be always arranged. Further, when semiconductor parts are produced in oversea lands, the transportation of parts takes a long period of time, due to which the shortening of period necessary for storage is limited.

(2) Selection of adhesive and sealing material:

In order to reduce the quantities of organic acids, halogen compound and the like vaporized from the epoxy resin, silicone resin and the like used as an adhesive or a sealing material, selection of the materials and adoption of more desirable processing conditions have been studied. However, this method requires a very delicate quality control, and it is quite difficult to supply stable products by this method.

(3) Replacement of gas:

In Japanese Patent Application Kokai (Laid-Open) Hei 1-139370, a method which comprises replacing the air in a vessel with nitrogen gas is proposed. However, this method also has the following problems: (i) it requires a particular apparatus for the replacement of air with nitrogen gas, (ii) the gas in the vessel is difficult to replace with nitrogen gas effectively, and the object cannot be achieved even by using a large quantity of nitrogen gas.

(4) Combination of replacement with nitrogen gas and a drier:

In Japanese Patent Application Kokai (Laid-Open) Hei 1-139370, a combination of replacement with nitrogen gas and the use of drier is proposed. However, this method also has problems similar to those in Method (3).

On the other hand, in Japanese Patent Publication Sho 62-40880, the use of an oxygen absorbent was disclosed as a method for preventing the rusting of metals. According to this method, a metal and metallic product is packed into a gas-barrier type parcelling material together with a permeable diffusing-parcel containing an oxygen absorbent and the whole is tightly sealed, whereby the sealed system is brought into an oxygen-free state and rusting of the metal is prevented.

As the oxygen absorbent, many substances have hitherto been proposed. They include, for example, those containing as main component sulfites, bisulfites, ferrous salts, dithionites, hydroquinone, catechol, resorcin, pyrogallol, gallic acid, Rongalit, ascorbic acid and/or its salt, isoascorbic acid and/or its salt, sorbose, glucose, lignin, dibutylhydroxytoluene, butylhydroxyanisole, powdery metals, and the like.

However, all the above-mentioned oxygen absorbents have a general disadvantage that their oxygen absorbing reaction does not progress in the absence of water. That is, these oxygen absorbents composed mainly of the above-mentioned compound or powdery metal can absorb oxygen only when they are mixed with water or a water-holding substance or they can utilize water vaporized from the material to be preserved.

Accordingly, for rust prevention of metals readily corrodible by water, the above-mentioned oxygen absorbents are not satisfactory because the moisture generated from the oxygen absorbent rusts the metal surface and makes it impossible to achieve the object, namely preservation of metal without deterioration in its quality.

As an improvement of such prior rust prevention techniques using an oxygen absorbent, there have been proposed the method of Japanese Patent Application Kokai (Laid-Open) Sho 63-198962 which comprises using an oxygen absorbent comprising an unsaturated fatty acid or a fatty oil composed of an unsaturated fatty acid, a transition metal or a transition metal compound and a basic substance, and the method of Japanese Patent Application Kokai (Laid-Open) Sho 64-67252 which comprises using an oxygen absorbent comprising an unsaturated fatty acid compound, a basic substance and an adsorbent.

Now, in the mechanism of quality deterioration, particularly rusting, of semiconductor devices or semiconductor parts, the rust caused by water appears most rapidly. Accordingly, the water in the preserved system must be removed as rapidly as possible. For this purpose, a method of using an oxygen absorbent and a drier in combination is disclosed in Japanese Patent Application Kokai (Laid-Open) Sho 56-153788. According to this method, however, the water in oxygen absorbent is gradually lost as it shifts to the drier and, as the result, oxygen absorbing performance is also lost. Thus, it has sometimes happened that the oxygen permeates into the parcel through the packaging film, even though it is very slight in quantity, elevates the oxygen concentration in the system, until the inhibitory effect can be deteriorated gradually.

When the above-mentioned oxygen absorbent compositions containing an unsaturated fatty acid compound as a main ingredient (Japanese Patent Application Kokai (Laid-Open) Sho 63-198962 and Sho 64-67252) are parcelled into a conventional permeable diffusing-parcelling material, the water present in the system for preserving electronic devices and parts, particularly semiconductor devices or semiconductor parts, is lower in absorption speed than the oxygen in the system because of the nature of the permeable diffusing-parcelling material, and hence no satisfactory inhibitory effect can be achieved by such a technique.

Further, there is an important problem regarding the handling of preservative, though it may not be directly related to prevention of semiconductor devices and semiconductor parts from deterioration. Thus, it is a problem that, if a preservative before or after use is allowed to stand in the atmospheric air, it generates heat and can fire when a large quantity of preservative is left in lump.

Further, as yet another problem, the following should be pointed out. Thus, as a permeable diffusing-parcelling material, a laminated product prepared by sticking paper and perforated plastic film is conventionally used. Since usual paper is used in this type of parcelling material, however, paper powder is generated when the ribbon-wise linked plural inhibitor parcels made of such a parcelling material are cut into individual parcels, and the powder adheres to the surface of parcel. Further, fine powder of the inhibitor composition leaks out of the parcel through the pores of plastic film and paper layer. The paper powder and fine powder of inhibitor composition thus formed pollute the semiconductor parts and the like or the material to be preserved and causes short-circuiting or rusting of the electric circuit, and thereby bring about undesirable results.

SUMMARY OF THE INVENTION

Thus, it is an object of this invention to produce an inhibitor parcel which can remove oxygen, water, acidic substances and halides present in preservation system as rapidly as possible and can remove water particularly rapidly, without carrying any dusts into the system. It is another object of this invention to preserve an electronic device or an electronic part such as semiconductor device or semiconductor part by the use of said inhibitor parcel without rusting them at the time of transportation, circulation and storage.

It is a further object of this invention to produce an inhibitor parcel which is suppressed in generation of heat even if allowed to stand in the presence of air before or after its use and does not fire in any account.

Thus, this invention provides an inhibitor parcel which comprises (a) a composition comprising an unsaturated fatty acid compound as its main ingredient and (b) a permeable diffusing-parcelling material prepared by laminating and bonding an oxygen permeable resin layer onto one side of a base sheet made of a fibrous material and an adhesive or onto one adhesive-coating side of a base sheet made of a fibrous material, laminating and bonding thereon an oxygen permeable resin layer and laminating and bonding a porous film of a low softening point resin or a low softening point nonwoven fabric onto the other side of the base sheet, said permeable diffusing-parcelling material (b) having an oxygen permeability of $10^4$ to $10^6$ ml/m$^2$.Atm.Day and a (water vapor permeability/oxygen permeability) ratio of 0.02 (H$_2$O mg.Atm/O$_2$ ml) or above at 25° C. at a relative humidity of 50% and said composition (a) being parcelled by said permeable diffusing-parcelling material.

As used in this invention, the term "inhibitor" means a substance preventing metals including iron, copper, rare earth elements and the like from rusting, discoloration and corrosion, and the term "permeable diffusing-parcelling material" means a parcelling material through which oxygen and water permeate diffusion.

Further, this invention also provides an inhibitor parcel for electronic devices and electronic parts which comprises said inhibitor parcel, and a method for preserving electronic devices and electronic parts which comprises tightly sealing an electronic device or an electronic part into a gas barrier type container together with said inhibitor parcel.

In addition to electronic devices and electronic parts the inhibitor parcel of this invention can be applied also to the preservation of industrial materials, medical devices and foods in which at least one of oxygen and water has a bad influence on preservation and in which adherence of dusts causes problems.

Further, this invention also provides a parcelled article for use in electronic devices or electronic parts which comprises (a) a composition comprising an unsaturated fatty acid compound as its main ingredient and (b) a permeable diffusing-parcelling material prepared by laminating and bonding an oxygen permeable resin layer onto one side of a base sheet made of a fibrous material and an adhesive or onto one adhesive-coating side of a base sheet made of a fibrous substance, laminating and bonding thereon an oxygen permeable resin layer and laminating and bonding a porous film of a low softening point resin or a low softening point nonwoven fabric onto the other side of the base sheet and (c) a gas barrier type container, said permeable diffusing-parcelling material (b) having an oxygen permeability of $10^4$ to $10^6$ ml/m$^2$.Atm.Day and a (water vapor permeability/oxygen permeability) ratio of 0.02 (H$_2$O Mg.Atm/O$^2$ ml) or above, at 25° C. at a relative humidity of 50% said composition (a) being parcelled by said permeable diffusing-parcelling material (b) and said electronic devices or electronic parts being sealed in the container (c) together with an inhibitor parcel in which said composition (a) is parcelled by said permeable diffusing-parcelling material (b).

DETAILED DESCRIPTION OF THE INVENTION

Figure 1:
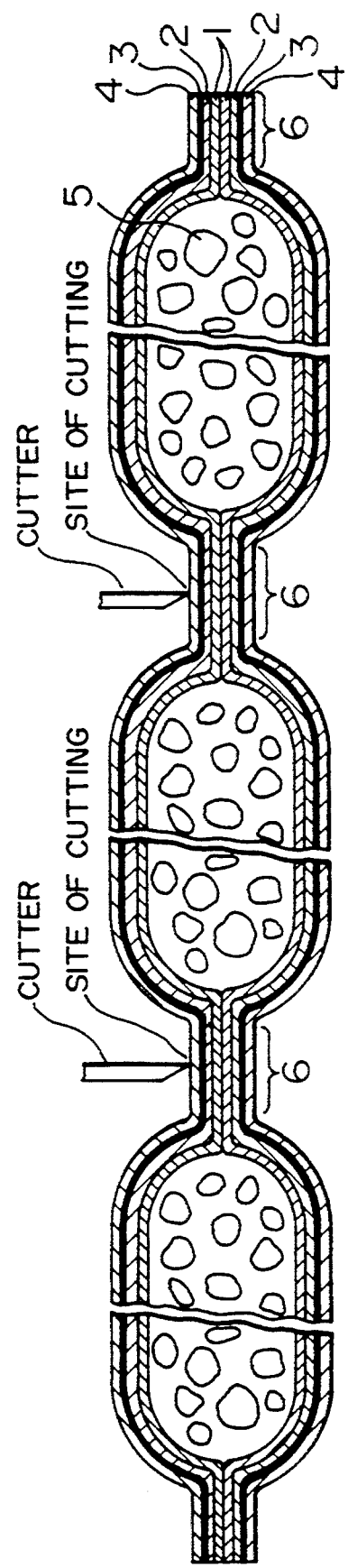
FIG. 1 illustrates one example of the sequence of inhibitor parcels wherein plural units of inhibitor parcel are linked through intermediation of seal parts 6.

The base sheet used in this invention can be produced according to the conventional method for producing paper or nonwoven fabric.

Examples of the method for producing the base sheet include addition of an adhesive to a fibrous material at the time of paper-making, and coating of a fibrous material with an adhesive after paper-making, etc. As the method for the paper-making, a method which comprises suspending a fibrous material into water to prepare a slurry preferably having a solid concentration of 0.1–10% by weight, screening the slurry with a net or the like, dehydrating it with a press or the like and drying it preferably at 50°–150° C. until its water content reaches 7% by weight or under can be referred to. The amount of adhesive is preferably 0.1–30 parts (by weight, hereinafter the same) and particularly 5–20 parts per 100 parts of fibrous material. If desired, a sizing agent, a pigment, a coagulant and the like may be added either in the process of paper-making or after it. Preferably, basis weight of the base sheet is 10–200 g/m$^2$, its Garley gas permeability is 50,000 seconds/100 ml in$^2$ or below, its thickness is 0.02–1 mm, pH of water extract is 2–10, and its mean pore diameter is 0.1 mm or below. Particularly preferably, its basis weight is 20–100 g/m$^2$, its Garley gas permeability is 30,000 seconds/100 ml in$^2$ or below, its thickness is 0.04–0.5 mm, and pH of its water extract is 4–9.

As the permeable diffusing-parcelling material (b) used in the inhibitor parcel of this invention, a material prepared either by laminating and bonding an oxygen-permeable layer onto one side of a base sheet made of a fibrous material and an adhesive and laminating and bonding a porous film of a low-softening point resin or a low softening point nonwoven fabric onto the other side of the base sheet, or by coating one side of a base sheet made of a fibrous material with an adhesive, laminating and bonding thereon an oxygen permeable layer and laminating and bonding a porous film of a low softening point resin or nonwoven fabric onto the other side of the base sheet is used.

As the fibrous material used in the base sheet of permeable diffusing-parcelling material (b), one or more materials selected from natural pulps such as craft pulp, chemical pulp and the like, synthetic pulps made of plastics such as nylon, polyethylene, polypropylene and the like, carbon fiber and the like is(are) used. Among them, natural pulps such as craft pulp and the like, synthetic pulps such as polyethylene, polypropylene and the like and carbon fiber are preferred. Width of the fibrous material is preferably 0.02–0.5 mm, and its length is preferably 0.1–30 mm.

As the adhesive added to the base sheet or coated onto the surface of the base sheet, at least one member selected from natural rubber, butadiene-styrene rubber, chloroprene, acrylic ester polymers, polyurethane, polyvinyl acetate, polyvinyl alcohol, cellulose and compounds thereof can be used, among which natural rubber, butadiene-styrene rubber, chloroprene, acrylic ester polymers and polyvinyl alcohol are preferred. In this invention, the adhesive prevents penetration of the material constituting the oxygen-permeable layer into base sheet and its bleeding onto another side of the base sheet. Further, the adhesive prevents the occurrence of dusts, such as fiber flocks, at the time of cutting the parcels.

Further, the adhesive of this invention increases (water permeability/oxygen permeability) ratio in co-operation with the oxygen-permeable resin and prevents bleeding of sulfur compounds and halogen compounds present in the fibrous material and their transfer onto the preserved material.

The oxygen-permeable membrane layer used in the permeable diffusing-parcelling material (b) of this invention has an oxygen permeability of $10^4$ to $10^6$ ml/m$^2$.Day.Atm and a high (water vapor permeability/oxygen permeability) ratio of 0.02 H$_2$O mg.Atm/O$^2$ ml or above, at 25° C. at a relative humidity of 50%.

If its oxygen permeability is smaller than $10^4$ ml/m$^2$.Day.Atm, velocity of oxygen absorption of inhibitor composition is limited by the permeable diffusing-parcelling material, so that no sufficient inhibitory effect can be achieved. If the oxygen permeability is greater than $10^6$ ml/m$^2$.Day.Atm, oxygen absorption velocity of the inhibitor is too great, so that the oxygen-absorbing ability of the inhibitor parcel is much deteriorated in the period from its production to its use, if the parcel is exposed to the air, or the inhibitor parcel after use can evolve heat rapidly when left standing in the atmospheric air, which makes its practical handling quite difficult. Accordingly, the oxygen permeability should preferably be in the range of $10^4$ to $10^6$ ml/m$^2$.Day.Atm.

Generally speaking, the formation of rust on metals is mainly caused by the existence of moisture and oxygen, and a great anti-rusting effect can be achieved by removing moisture as rapidly as possible rather than removing oxygen. In other words, in a preservation system containing an object of preservation, it is necessary to remove moisture exhaustively by the use of an inhibitor parcel having a (water vapor permeability/oxygen permeability) ratio of 0.02 H$_2$O mg.Atm/O$_2$ ml or above, before eliminating oxygen from the system.

If a permeable diffusing-parcelling material of which (water vapor permeability/oxygen permeability) ratio is smaller than 0.02 H$_2$O mg.Atm/O$_2$ ml and of which water vapor permeability and oxygen permeability are both great is used, the rusting caused by water and oxygen can be prevented but the sulfur compounds and halogen compounds bleeding out of fibrous material cannot be captured. As such rusting cannot be prevented, and fine powder cannot be captured. Further, the high oxygen permeability is practically undesirable because it causes a great drop in rust-preventing ability before use and causes a rapid generation of heat when the parcel is left standing in the atmospheric air after use.

In the preservation of electronic articles and particularly semiconductor devices and semiconductor parts, the pollution caused by fine dusts must be prevented completely.

The oxygen-permeable membrane layer of this invention is used for the purpose of blocking the perforated areas of the base sheet in co-operation with the above-mentioned adhesive and thereby preventing leakage of the dusts generated from the inhibitor parcel. More concretely speaking, it is used for the purpose of capturing dusts of 0.3 micron or greater at a capturing rate of 50% or more when a dust-containing air is passed through it. The oxygen permeable membrane layer may also be one having no perforations or one allowing only a very slight passage of dusts even if it has perforations.

As the material constituting the oxygen permeable membrane layer, silicone resin, polyethylene, ethylene-vinyl acetate copolymer, natural rubber, synthetic rubbers, cellulose and compounds thereof can be used preferably.

In coating these substances onto base sheet surface, a solution of monomer or oligomer of the abovementioned substances in a solvent is coated onto base sheet, after which the coating is polymerized and then the solvent is vaporized off when it is made of a monomer and the solvent is directly vaporized off when the coating is made of a polymer.

When such an oxygen permeable membrane layer of this invention is coated onto base sheet made of a fibrous material, existence of an adhesive is indispensably necessary either in the base sheet or on one side of the base sheet onto which the oxygen permeable membrane layer is to be coated. The reason is that, if no adhesive exists in the base sheet or on one side of base sheet, the material constituting the oxygen permeable membrane layer coated onto base sheet permeates into the base sheet and bleeds out onto the other side of the sheet and thereby makes it impossible to achieve the intended performance.

The oxygen permeable membrane layer preferably has a thickness of 0.1–100 microns and more preferably 1 to 50 microns.

A porous film of low softening point resin is laminated onto the other side of the base sheet with regard to the oxygen permeable layer. The porous film layer of low softening point resin is used for the purpose that, when the part to be sealed is heated, the porous film of low softening point resin can be melted and sealed to form a parcel while allowing permeation of oxygen and water through the parcel. As the porous film of low softening point resin, a perforated film of a low softening point resin such as polyethylene, ethylene-vinyl acetate copolymer, ethylene-acrylic acid copolymer and the like having a thickness of 5 to 100 microns or an nonwoven fabric prepared by entangling a fiber of low softening point resin such as polyethylene and the like can be used. Preferably, thickness of the porous layer of low softening point resin is 5 to 100 microns, its pore diameter is 0.05 to 15 mm, and its porosity is 1% or above, and more preferably its thickness is 20 to 100 microns, its pore diameter is 0.10 to 10 mm and its porosity is 2 to 40%. Although the method for perforating the low softening point resin film is not critical, a method which comprises laminating a film onto the base sheet and then perforating the whole with a needle, a method which comprises perforating a film and then laminating the perforated film onto a base sheet, and the like can be used preferably. As the method for laminating a film layer onto a base sheet, extrusion lamination, hot press lamination and the like can be used.

The permeable diffusing-parcelling material (b) used in this invention is fundamentally prepared by laminating and bonding an oxygen-permeable membrane layer onto one side of a base sheet and a porous film of a low softening point resin or a low softening point nonwoven fabric onto the other side of the base sheet. However, those prepared by laminating and bonding other sheets and films between these layers, films and base sheet can also be used as a permeable diffusing-parcelling material for use in the inhibitor parcel of this invention. Hereunder, examples of the concrete construction of the permeable diffusing-parcelling material for use in the inhibitor parcel of this invention will be mentioned, provided that this invention is by no means limited by these examples.

(A) A material prepared by laminating and bonding an oxygen permeable film onto one side of a base sheet and a porous film of a low softening point resin or a low softening point nonwoven fabric onto the other side of the base sheet.

(B) A material prepared by laminating and bonding a porous film of a low softening point resin to one side of a base sheet and a porous film of a low softening point resin/oxygen permeable membrane layer to the other side of the base sheet. As used herein, the term "porous film of low a softening point resin/oxygen permeable membrane layer" means a laminate film composed of a porous film of a low softening point resin and an oxygen permeable membrane layer.

(C) A material prepared by laminating and bonding an adhesive layer onto one side of a base sheet and overcoating the adhesive layer with an oxygen permeable membrane layer and laminating and bonding a porous film of a low softening point resin or a low softening point nonwoven fabric onto the other side of the base sheet.

(D) A material prepared by laminating and bonding an oxygen permeable membrane layer onto one side of a base sheet and laminating and bonding a reinforcing material sheet and a porous film of a low softening point resin or a low softening point nonwoven fabric onto the other side of the base sheet.

(E) A material prepared by laminating and bonding an adhesive layer onto one side of a base sheet and overcoating the adhesive layer with an oxygen permeable membrane layer and laminating and bonding a reinforcing material sheet and a porous film of a low softening point resin or a low softening point nonwoven fabric onto the other side of the base sheet.

As said adhesive, a mixture of clay and polyvinyl alcohol or a mixture prepared by additionally blending a rubber into the above-mentioned mixture is preferably used.

As the oxygen permeable membrane layer, silicone resin, polyethylene resin, ethylene-vinyl acetate copolymer, natural rubber, synthetic rubbers, cellulose and compounds thereof are used.

In laminating and bonding an oxygen permeable membrane layer onto a base sheet in the above-mentioned concrete examples, the following procedure is usually adopted. Thus, when the base sheet is made of a fibrous material and an adhesive, the oxygen permeable membrane layer is directly laminated and bonded onto the base sheet. When the base sheet is made of a fibrous material only, an adhesive is first coated onto the sheet surface and thereafter an oxygen permeable membrane layer is coated thereon.

Although the method for parcelling an inhibitor composition into a permeable diffusing-parcelling material is not critical, the following method is adopted usually. Thus, after weighing out the composition, it is packaged into a permeable diffusing-parcelling material by means of a 3-way seal packaging machine or a 4-way seal packaging machine, preferably in such a manner that the low softening point resin film or the low softening point nonwoven fabric comes inside.

As the form of parcel, not only pouch but also blister packaged tablet-form composition can be adopted.

The unsaturated fatty acid compound used as the main ingredient of the inhibitor composition (a) of this invention is an oxygen absorbent which reacts with oxygen present in the system. As said unsaturated fatty acid compound, unsaturated fatty acids, esters of unsaturated fatty acids, metallic salts of unsaturated fatty acids, and the like can be referred to, and at least one member selected from these substances is used.

Among them, metallic salts of unsaturated fatty acids, mixtures of an unsaturated fatty acid and a metallic salt of unsaturated fatty acid, mixtures of an ester of unsaturated fatty acid and a metallic salt of unsaturated fatty acid, and the like are preferred.

The unsaturated fatty acid used in the composition of this invention preferably has 10 or more carbon atoms. Among these fatty acids, oleic acid, linoleic acid and linolenic acid are particularly preferred. These unsaturated fatty acids may be used in the form of a mixture of two or more members. Fatty acid mixtures obtained from vegetable and animal fatty oils containing a high percentage of triglyceride of unsaturated fatty acids such as linseed oil, soybean oil, tung oil, rice bran oil, sesame oil, cotton seed oil, rapeseed oil and the like, namely linseed oil fatty acid, soybean oil fatty acid, tung oil fatty acid, rice bran oil fatty acid, sesame oil fatty acid, cotton seed fatty acid, rapeseed fatty acid and the like, are also usable in this invention. These fatty acid mixtures may be contaminated by saturated fatty acids.

As said ester of unsaturated fatty acid, vegetable oils such as linseed oil, soybean oil, tung oil, rice bran oil, sesame oil, cotton seed oil, rapeseed oil and the like are preferably used. These esters of unsaturated fatty acid may be used in the form of a mixture of two or more members.

As used herein, the term "metallic salt of unsaturated fatty acid" inclusively means metallic salts of various fatty acids, and its examples include alkaline earth metal salts, alkali metal salts, transition metal salts and aluminum salts of the unsaturated fatty acids derived from vegetable and animal fatty oils containing a high percentage of the above-mentioned triglycerides of unsaturated fatty acids. Among them, salts of transition metals selected from the group consisting of V, Cr, Mn, Co, Fe, Ni, Cu and Zn are preferred because they much promote the oxygen-absorbing function of the unsaturated fatty acid compounds.

The transition metal or a compound thereof used in the composition of this invention is a catalyst for promoting the oxygen absorbing function of unsaturated fatty acid compounds. As such catalysts, various transition metals and their compounds can be referred to.

Although the anion in the transition metal compound is not critical, salts of halogens, sulfuric acid, bisulfuric acid, sulfurous acid, bisulfurous acid, nitro, nitroso, phosphoric acid, hydrogen phosphoric acid, phosphorous acid, carbonic acid, bicarbonic acid and boric acid are preferred. Salts of saturated fatty acids, unsaturated fatty acids and other organic acids such as naphthenic acid and the like are also usable preferably. Though the cation is not critical so far as it is a transition metal, transition metals selected from the group consisting of V, Cr, Mn, Co, Fe, Ni, Cu and Zn are preferred because they much promote oxygen absorption of the inhibitor composition.

Transition metals having a standard single electrode potential of zero volt or above and compounds thereof are also preferably usable, because they particularly suppress the formation and vaporization of peroxides among the oxidized products of unsaturated fatty acid compounds.

The transition metal may also form a complex compound involving an amine, an alkylamine or the like as ligands. Powders of the above-mentioned transition metals are also usable. The adsorbent used in the inhibitor composition of this invention adsorbs water and corrosive gases and thereby gives the inhibitor composition a drying function and enhances its inhibitory effect.

As such an adsorbent, those adsorbing water and/or adsorbing corrosive gases such as unpleasant odor components, organic acids, halogen compounds, amines, etc. generated when an unsaturated fatty acid compound absorbs oxygen are preferably used. Concretely speaking, silicic acid compounds such as silica gel, zeolite, active clay and the like, active charcoal, activated alumina and the like are preferably used. Among them, silica gel, activated alumina, zeolite and active charcoal are particularly preferable. These adsorbents are used either singly or in the form of a mixture of two or more.

Although the shape of the adsorbent is not critical, its grain size is preferably 10 mm or below and more preferably 5 mm or below. These adsorbents are preferably heat-treated at 50° C. or above and more preferably at 100° C. or above before use.

It is also possible to use the adsorbent as a carrier for a single fatty acid compound or a mixture of plural unsaturated fatty acid compounds such as unsaturated fatty acid, ester of unsaturated fatty acid and metallic salt of unsaturated fatty acid, and/or transition metal or compound thereof.

As the basic substance used in the composition of this invention, oxides, hydroxides, carbonates, bicarbonates, phosphates, silicates and organic acid salts of alkaline earth metals and alkali metals, oxides, hydroxides, carbonates, phosphates, silicates and organic acid salts of aluminum, oxides, hydroxides and carbonates of transition metals, organic basic substances such as polyethyleneimine, guanidine carbonate, melamine and the like, organic amines such as 2,4,6-tri(dimethylaminomethyl)-phenol, alpha-n-butylpyrrolidine and the like can be referred to. Among them, basic compounds of alkaline earth metals are preferable, and calcium oxide, calcium hydroxide, calcium carbonate, magnesium oxide, magnesium hydroxide and magnesium carbonate are particularly preferred.

The basic substance reacts with the unsaturated fatty acid compound constituting the composition of this invention to solidify the latter. It may be used in the form of granule or powder in order to make the inhibitor composition easy to handle. Further, the basic substance captures the organic acids formed by the reaction between unsaturated fatty acid compound and oxygen and thereby inhibits the generation of unpleasant odor. Further, the basic substance absorbs the acidic gases present in the closed system in which the inhibitor composition and metal or metallic article are sealed, and thereby enhances the inhibitory effect.

In addition to the above-mentioned effects, calcium oxide, magnesium oxide and the like effectively absorbs water, so that they are particularly preferably used in this invention.

When a basic substance, an adsorbent or a transition metal compound is used, they are used in the following amount, all per 100 parts by weight of unsaturated fatty acid compound as an indispensable component. Thus, when a basic substance is used, it is added preferably in an amount of 0.1–1,000 parts by weight. When an adsorbent is used, it is added preferably in an amount of 50–2,000 parts by weight. When a transition metal compound is used, it is added preferably in an amount of 0.001–10 parts by weight. More preferably, a basic substance is added in an amount of 1–500 parts by weight, and adsorbent is added in an amount of 100–1,000 parts by weight.

Said basic substance, adsorbent and transition metal compounds are appropriately selected and put to use in accordance with requirement.

From the standpoint that the inhibitory effect is enhanced by adsorbing water as quickly as possible, it is a preferred embodiment in this invention that a basic substance or an adsorbent is added to at least one kind of transition metal or its compound as an oxygen-absorbing catalyst. When the main ingredient of the composition is a transition metal salt of an unsaturated fatty acid, its combined use with a basic substance or with an adsorbent or with a combination of a basic substance and an adsorbent gives a good result.

If desired, a substance keeping a solid state over the whole temperature range from 10° C. to 50° C. and liquefies and transforms into a fluid substance at a temperature selected from the range of 50° C. to 230° C. (hereinafter, this substance is referred to as "anti-exothermic substance") can be added to the inhibitor composition of this invention. The anti-exothermic substance suppresses generation of heat when the inhibitor composition of this invention is allowed to stand under atmospheric condition.

Examples substances usable as said anti-exothermic substance include polymeric substances, saturated higher aliphatic compounds exemplified by saturated higher aliphatic hydrocarbons, saturated higher aliphatic alcohols, saturated higher fatty acids, saturated higher fatty acid amides, metallic salts (metallic soaps) of saturated higher fatty acids, esters of saturated higher fatty acids and the like, and compounds exemplified by hydrogenated fatty oils and natural waxes. As used herein, the term "higher" roughly means that the compound has 10 or more, preferably 16 or more, carbon atoms. Among these substances, the following substances are preferred: vinyl acetate resin, phenoxy resin, butadiene resin, fluorinated resin, polyamide resin, polyethylene, polyester, polyethylene terephthalate (PET), polybutylene terephthalate (PBT), polycarbonate (PC), polystyrene, polypropylene, methacrylic resin, acrylic resin, methylpentene polymer, polyethylene glycol, polybutylene glycol, low molecular weight polyethylene wax, palmitic acid, stearic acid, behenic acid, palmitylamide, stearylamide, behenylamide, and alkaline earth metal salts and aluminum salts of palmitic acid, stearic acid, behenic acid and mixture thereof.

In this invention, the anti-exothermic substance may be used either singly or in combination of two or more.

Although ratio of the anti-exothermic substance to the unsaturated fatty acid compound as the main ingredient of the inhibitor composition (b) of this invention is not critical, it is preferable to use 1–1,000 parts by weight of anti-exothermic substance per 100 parts by weight of the unsaturated fatty acid compound.

The mechanism according to which generation of heat from inhibitor composition of this invention is suppressed by the anti-exothermic substance when the composition is allowed to stand in the atmospheric air is unknown. However, it is probably according to the following mechanism. Thus, if an anti-exothermic substance is mixed into a composition mainly composed of unsaturated fatty acid compound or dispersed into the surface layer of the composition, the inhibitor which has been a solid substance over the whole temperature range of 10° C. to 50° C. turns to a liquid when it reaches liquefying temperature (some temperature not lower than 50° C. and not higher than 230° C.) due to the heat generated by itself upon absorption of oxygen, and covers the surface of the composition, whereby the composition is intercepted from the surrounding air and the generation of heat is suppressed.

Next, one example of the inhibitor parcel will be explained by way of the accompanying drawing.

FIG. 1 illustrates the construction of a product produced by coating adhesive 3 onto one side of the base sheet 2, coating thereon the oxygen permeable membrane layer 4, laminating and bonding a porous film of a low softening point resin 1 onto the other side of the base sheet to give a permeable diffusing-parcelling material, and parcelling composition 5, comprising an unsaturated fatty acid compound as a main ingredient with said permeable diffusing-parcelling material so that the porous film of low softening point resin 1 comes inside.

It is shown in this drawing that the superposed area of two porous films of a low softening point resin is thermocompression-bonded to form a sealing area 6, and a plurality of inhibitor parcels are linked together ribbonwise through intermediation of the sealing area 6 (hereinafter, the ribbon-wise linked product is referred to as "linked parcel").

When the inhibitor parcel of this invention is to be put to use, the central part, or its vicinity, of the sealing area 6 of the linked parcel is usually cut with a cutter to separate individual parcels from one another, and each parcel is introduced into a preservation system together with the object of preservation, and then the whole is tightly sealed.

Next, as the gas barrier type container (c) used for preserving an electronic device or an electronic part together with the inhibitor of this invention, materials generally called a "bag" made of a gas barrier type parcelling material are also usable. The container preferably has an oxygen permeability of 10 ml/Day or below, particularly 5 ml/Day or below, per 100 ml of the volume. Its water vapor permeability is preferably 10 g/Day or below and particularly 5 g/Day or below, per 100 ml of volume. As the material constituting the container (c), plastics and metals are preferred. For example, metallic cans made of iron, tin plate, stainless steel, aluminum or the like, bags made of monolayer film or composite film of polyamide (nylon and the like), polyolefin (polyethylene, polypropylene and the like), polyester (polyethylene terephthalate and the like), aluminum, polyvinylidene chloride, polyvinyl chloride and the like, and plastic cases made of polyamide, polyolefin, polyester, polyvinyl chloride, polystyrene, polycarbonate and the like can be used. In the case of a bag, materials of which the inner face can be bonded thermally are preferable from the viewpoint of tightly sealing the bag.

The container may be provided with a pocket for containing the inhibitor parcel. As the material constituting the pocket, a film having an oxygen permeability of 100 ml/$m^2$.Atm.Day or above, a microporous film having a Garley gas permeability of 100,000 seconds/100 ml $in^2$ or below, a porous film laminated on paper or nonwoven fabric as a base sheet, a material prepared by laminating a film having an oxygen permeability of 100 ml/$m^2$.Atm.Day or above onto one side of a base sheet having a Garley gas permeability of 100,000 seconds/100 ml in² or below and a porous film onto the other side of the base sheet, and the like can be used. By this means, the inhibitor parcel can be isolated from the electronic device or the electronic part. It is also allowable to wrap the electronic device or electronic part with paper, permeable plastic film or the like in order to prevent them from direct contact with the inhibitor parcel. It is also possible to immobilize or fix either of the inhibitor parcel or the electronic device or part onto the container in order to prevent their direct contact.

When an electronic device or part and an inhibitor parcel are introduced into a container and then it is tightly sealed, the air present in the container may be substituted with nitrogen gas or the like previously. Otherwise, the sealing of the container may be carried out after evacuating the inner atmosphere of the container.

As the electronic part and semiconductor part, lead frame, IC chip, vapor deposition aluminum of spattering target, copper board for immobilizing it, etc. can be referred to. The lead frame is to be bonded to IC chip, and it is prepared by physically or chemically grinding surface of a formed copper alloy article. Products produced by additionally plating the surface with silver or gold are also used. As the IC chip, products prepared by forming a circuit on a silicon base sheet and attaching vapor deposited aluminum thereto as a wiring element, and the like are referred to.

As an example of the semiconductor, that prepared by applying an adhesive such as epoxy resin or the like to the above-mentioned lead frame, bonding IC chip thereto, thereafter wiring between the lead frame and the IC chip and sealing and forming the whole with silicone resin, epoxy resin or the like can be referred to. As the adhesive used for this purpose, amine-cured epoxy resins and the like can be referred to. Examples of the amine curing agent include Versamide-4,4-diaminodiphenylsulfone, m-phenylenediamine, dimethylaminomethylamine, trimethylamine, trimethylenetetramine, ethylenediamine and the like can be referred to. Bonding can be achieved by reacting these curing agents with Bisphenol A or the like and curing them. This reaction is carried out at a temperature of 10°–100° C., preferably 20°–80° C., at a humidity of 90% RH (Relative Humidity) or below, preferably 70% RH or below.

Here, as a method for the parcelling and preservation in the above-mentioned means for solution, there can be mentioned a method which comprises applying an adhesive onto a lead frame, attaching IC chip thereto, curing the adhesive and bonding the materials by keeping them under the above-mentioned reaction conditions, introducing and packaging the bonded product into a gas barrier type container together with the inhibitor parcel of this invention, and storing it. As a more preferable method, there can be mentioned a method which comprises applying an adhesive onto a lead frame, attaching IC chip thereto, introducing them into a gas barrier type container together with an inhibitor parcel of this invention, keeping the whole under the above-mentioned reaction conditions to cure the adhesive, bonding the whole and storing the bonded lead frame. The latter method is desirable in that the bonding conditions can readily be achieved and the whole can easily be stored as it is while effectively preventing rusting. Further, the rusting of the lead frame and IC chip caused by the halogen compounds and acidic substances vaporized from the adhesive and the water, oxygen and acidic gases penetrating into the system from the atmopshere can be prevented.

Further, this IC chip-bonded lead frame is subjected to a wiring work using a gold wire between the lead frame and IC chip and then sealed. The sealant used for this purpose is a composition prepared by adding an inorganic filler to silicone resin or epoxy resin. As the resin, silicone resin, epoxy/novolac resin, epoxy/acid anhydride resin and the like can be used, among which silicone resin and epoxy/acid anhydride resin are preferred. As the inorganic filler, silica compounds and the like are used. The sealing is carried out by reacting and curing a mixture consisting of a curing agent (amine, acid anhydride and the like), Bisphenol A and inorganic filler on IC chip. The reaction is carried out at a temperature of 50°–250° C. at a humidity of 90% RH or below, preferably at a temperature of 70°–200° C. at a humidity of 70% RH or below.

Here, as a method for the parcelling and preservation in the above-mentioned means for solution, a method which comprises applying a sealant, followed by introduction into container, sealing the whole by keeping it under the above- mentioned reaction conditions, parcelling the sealed material in a gas barrier type container together with an inhibitor composition of this invention, and preserving it and a method which comprises attaching a sealant, followed by sealing the material into a gas barrier type container together with an inhibitor composition of this invention, and preserving the whole while sealing it under the above-mentioned conditions can be referred to. Among these methods, the latter method is more preferable.

In the above-mentioned method for preserving electronic devices and electronic parts and particularly semiconductor devices and semiconductor parts, a hygroscopic organic substance supported on a supporting sheet may be sealed together with the inhibitor parcel of this invention, and if desired a sheet-form drier additionally containing a basic substance may be used.

The sheet-form drier of this invention is used for preservation of semiconductor or the like when relative humidity of the preservation system must be kept at 50% RH or under, and a hygroscopic organic substance and a supporting sheet capable of realizing such a condition must be selected in such a case.

The hygroscopic organic substance used in the sheet-form drier of this invention is a substance capable of bringing the relative humidity of the system to 50% RH or under, and organic compounds having a hydroxyl group or an amino group or both these groups can be used for this purpose. Further, the organic compound used for this purpose preferably has a viscosity of $10^4$ cp or under at a temperature of 100° C. or below.

Concrete examples of said hygroscopic organic substance include polyhydric alcohols such as trimethylolpropane, glycerine, methoxypropanediol, ethoxypropanediol and the like; aminoalcohols such as mono-, di- and tri-ethanolamines, mono-, di- and tri-propanolamines and the like; poly(meth)acrylic acid, (meth)acrylic acid-vinyl alcohol copolymer, polyethylene glycols, dimethylthiourea, cycanamide, methylimidazole and the like, among which glycerine is most preferred.

Said hygroscopic substances may be used either singly or in the form of a mixture of two or more.

The supporting material of this invention is used for the purpose of holding the hygroscopic organic substance, enhancing the water vapor absorbing rate and retaining the shape of the sheet. Although the supporting sheet is not critical so far as it can hold the hygroscopic organic substance, preferably it is a paper made of natural pulp, a synthetic paper made of polyethylene, polypropylene, polyethylene terephthalate or the like, a nonwoven fabric, a mixed paper and a cloth consisting of natural pulp and synthetic fiber, and the like.

If desired, a sizing agent, a binder, a coagulant or an antistatic agent may be added to the supporting sheet.

The supporting sheet usually has a basis weight of 10–500 g/m$^2$ and a thickness of 0.1–9.5 mm.

The hygroscopic organic substance is supported onto the supporting sheet by an impregnation method comprising dipping a base material into a hygroscopic organic substance or a method of coating a hygroscopic organic substance onto the surface of supporting sheet by the use of a coater, and the like.

The hygroscopic organic substance is supported in an amount of 10–500 parts by weight per 100 parts by weight of supporting sheet.

In order to accelerate permeation of the hygroscopic organic substance into the supporting sheet and increasing the amount of supported hygroscopic organic substance, a lower alcohol such as ethanol, methanol and the like, a surfactant such as alkali salt of fatty acid, salt of alkylbenzenesulfonic acid, higher alcohol compound, fluorine compound and the like may be added as a penetrant.

If desired, the sheet-form drier of this invention may be used in combination with a basic substance.

By its combined use with a basic substance, the sheet acquires an acidic substance absorbing function and becomes able to absorb sulfur compound, halogen compound and nitrogen compound exhibiting an acidity or organic acids remaining in the container or penetrating into the container.

The basic substance used for this purpose may be any of inorganic and organic basic substances. Particularly, amine compounds such as triethanolamine, triaminobenzene, ethylenediamine and the like are preferably used either singly or in the form of a mixture of two or more.

In this invention, there are various methods for the combined use of the basic substance. Usually, it is used by a method of dissolving a basic substance into a hygroscopic organic substance and supporting it on a supporting sheet together with the hygroscopic organic substance, a method of supporting a hygroscopic organic substance onto a supporting sheet and thereafter adding thereto a basic substance, and the like. Otherwise, it is also possible to superpose a sheet carrying a hygroscopic organic substance and a sheet carrying a basic substance and then parcel them. The amount of the basic substance is 10–200 parts by weight per 100 parts by weight of base material.

The sheet-form drier of this invention is used as a parcel packaged with a permeable diffusing-parcelling material, and its thickness is 0.5–10 mm.

DESCRIPTION OF PREFERRED EMBODIMENT

Example 1: Production of Base Sheet

Production of sheet A

After beating 100 kg of kraft pulp together with 4,000 kg of water, 10 kg of a polyacrylic ester was added thereto to form a slurry. After screening the slurry by means of a wire gauze, it was dehydrated by means of press roll until its water content reached 20%. Then, it was further dried by means of drying roll at 105° C. until its water content reached 4%. The processing speed was 20 m/minute. The sheet thus prepared had a basis weight of 50 g/m$^2$, a thickness of 0.06 mm and a Gurley gas permeability of 15 seconds/100 ml.

Production of sheet B

After beating 100 kg of kraft pulp together with 4,000 kg of water, the resulting slurry was screened by means of a wire gauze, dehydrated with a press roll until its water content reached 20%, and then dried with drying roll at 105° C. until its water content reached 4%. The processing speed was 20 m/minute. The sheet thus obtained had a basis weight of 52 g/m$^2$, a thickness of 0.06 mm and a Garley gas permeability of 20 seconds/100 ml in$^2$.

Production of sheet C

Fifty kilograms of a polyethylene fiber (fiber width 2 deniers, fiber length 100 mm) and 50 kg of a polyethylene-polypropylene composite fiber (fiber width 3 deniers, fiber length 100 mm) were beaten together with 4,000 kg of water to prepare a slurry. After screening the slurry with wire gauze, it was dehydrated with press roll until its water content reached 15%, and then dried with a drying roll at 105° C. until its water content reached 1%. The processing speed was 15 m/minute. The sheet was put between a pair of rolls (roll diameter 500 mm) having a roll surface temperature of 160° C. under a load of 1,000 kg at a processing speed of 10 m/minute, and cross points of fibers were welded to prepare Sheet C. The sheet thus obtained had a basis weight of 60 g/m$^2$, a thickness of 0.09 mm and a Garley gas permeability of 23 seconds/100 ml in$^2$.

Examples 2–10

One side of each of the base sheets B and C produced in Example 1 was coated with an adhesive, and thereon was coated an oxygen permeable resin layer. One side of base sheet A was also coated with an oxygen permeable resin layer. Then, a porous film of a low softening point resin or a low softening point nonwoven fabric was placed on the other side of base sheets A, B and C and each of A, B and C thus coated was put between a pair of rolls (400 mm in diameter) having a roll surface temperature of 140° C. under a load of 1,200 kg at a processing speed of 10 m/minute to laminate the porous film of a low softening point resin or a low softening point nonwoven fabric onto each base sheet. Oxygen permeability, water vapor permeability, (water vapor permeability/oxygen permeability) ratio and dust capturing efficiency of each of the permeable diffusing-parcelling materials thus prepared are summarized in Table 1.

Coating of adhesive

A 30% aqueous solution of starch or polyvinyl alcohol or an aqueous suspension containing 30% of polyvinyl alcohol and 50% of clay was coated and dried at 130° C. for 1.5 minutes.

Method for coating oxygen permeable resin

1. Method for coating silicone resin

A base sheet was coated with a solution consisting of 100 parts of silicone resin monomer (SD7328 manufactured by Torey Silicone, resin content 30% in toluene), 0.6 part of catalyst (SRX212, manufactured by Torey Silicone, toluene solution) and 500 parts of toluene, and the silicone resin was polymerized at 140° C. for one minute.

2. Method for coating natural rubber

A base sheet was coated with a solution prepared by dissolving 100 parts of a toluene solution of natural rubber (rubber content 30%) into 500 parts of toluene, and the toluene was vaporized off at 130° C. for 0.8 minute.

Comparative Examples 1 and 2

A porous film of a low softening temperature resin or nonwoven fabric and a pure white roll paper (basis weight 70 g/m², thickness 0.2 mm) as a base sheet were put between a pair of rolls (400 mm in diameter) at a roll surface temperature of 140° C. under a load of 1,200 kg to laminate the porous film or nonwoven fabric of low softening temperature resin onto the base sheet. Oxygen permeability, Water vapor permeability, (water vapor permeability/oxygen permeability) ratio and dust capturing efficiency of the permeable diffusing-parcelling materials thus prepared are summarized in Table 1.

Comparative Examples 3 and 4

One side of a pure white roll paper (basis weight 70 g/m², thickness 0.2 mm) was coated with an oxygen permeable resin. On the other side of the paper, a porous film or unwoven fabric of low softening temperature resin was placed and the whole was inserted between a pair of rolls (diameter 400 mm) at a processing speed of 10 m/minute at a roll surface temperature of 140° C. under a load of 1,200 kg, and the porous film or nonwoven fabric of low softening temperature resin was laminated onto the base sheet. Oxygen permeability, water vapor permeability, (water vapor permeability/oxygen permeability) ratio and dust capturing efficiency of the permeable diffusing-parcelling materials thus prepared are summarized in Table 1.

Comparative Example 5

A porous film or nonwoven fabric of low softening temperature resin was superposed on Tyvek (1073B, manufactured by DuPont, average basis weight 70 g/m²), and the whole was inserted between a pair of rolls (diameter 400 mm) at a processing speed of 5 m/minute at a roll surface temperature of 120° C. under a load of 1,500 kg to laminate the porous film or nonwoven fabric of low softening temperature resin onto the base sheet. Oxygen permeability, water vapor permeability, (water vapor permeability/oxygen permeability) ratio and dust capturing efficiency of the permeable diffusing-parcelling material thus obtained are summarized in Table 1.

TABLE 1

| | Base sheet | Low softening point resin layer *3 | Adhesive layer Kind *4 | Adhesive layer Coating amount (g/m²) | Oxygen-permeable resin layer Kind *5 | Oxygen-permeable resin layer Coating weight (g/m²) |
|---|---|---|---|---|---|---|
| Example No. | | | | | | |
| 2 | A | 1 | A | 3 | Si | 1.5 |
| 3 | B | 1 | PK | 25 | R | 1.5 |
| 4 | B | 1 | PK | 25 | Si | 6.0 |
| 5 | B | 1 | PK | 25 | Si | 2.0 |
| 6 | B | 1 | PK | 25 | Si | 1.5 |
| 7 | B | 1 | P | 9 | Si | 1.5 |
| 8 | B | 1 | D | 9 | Si | 1.5 |
| 9 | B | 2 | PK | 25 | Si | 1.5 |
| 10 | C | 1 | PK | 25 | | 1.5 |
| Comparative Example 1 | | 1 | | | | |
| 2 | | 3 | | | | |
| 3 | | 1 | | | Si | 1.5 |
| 4 | | 3 | | | R | 1.5 |
| 5 | | 1 | | | | |

| | Garley gas permeability (sec/100 ml) | Oxygen permeability *6 (ml in²/m² · Day · Atm) | Water vapor permeability *6 (mg/m² · Day) | 0.3μ or more dust capturing efficiency (%) | [Water vapor permeability/oxygen permeability] ratio (H₂O mg · Atm/O₂ ml) 25° C., RH 50% |
|---|---|---|---|---|---|
| Example No. | | | | | |
| 2 | *1 | 100000 | 3100 | *2 | 0.031 |
| 3 | *1 | 60000 | 1500 | *2 | 0.025 |
| 4 | *1 | 30000 | 1000 | *2 | 0.030 |
| 5 | *1 | 90000 | 2700 | *2 | 0.030 |
| 6 | *1 | 300000 | 9200 | *2 | 0.030 |
| 7 | 50000 | 120000 | 3200 | 95 | 0.026 |
| 8 | 1100 | 650000 | 25000 | 50 | 0.038 |
| 9 | *1 | 270000 | 8200 | *2 | 0.030 |
| 10 | *1 | 320000 | 9500 | *2 | 0.029 |
| Comparative Example | | | | | |
| 1 | 7 | 900000 | 6500 | 5 | 0.007 |
| 2 | 2500 | 290000 | 2400 | 25 | 0.008 |
| 3 | 57 | 850000 | 4500 | 12 | 0.005 |
| 4 | 54 | 830000 | 4300 | 11 | 0.005 |

TABLE 1-continued

| | | | | | |
|---|---|---|---|---|---|
| 5 | 24 | 1090000 | 7500 | 3 | 0.007 |

(Notes)
*1: Garley gas permeability was unmeasurable, because it exceeded $10^5$ seconds/100 ml in$^2$.
*2: Dust capturing efficiency was unmeasurable because of smallness of air permeability. Dust capturing efficiency was presumably 95% or above.
*3: Low softening point laye
1: Perforated polyethylene (Perforated Type B, manufactured by New Japan Arc, 30μ in thickness)
2: Unwoven fabric
3: Perforated polyethylene (Perforated Type P, manufactured by New Japan Arc, 30μ in thickness)
*4: Kind of adhesive
A: Polyacrylic ester
P: Polyvinyl alcohol
PK: Mixture of polyvinyl alcohol and clay
D: Starch
*5: Oxygen-permeable resin
Si: Silicon resin
R: Natural rubber
*6: Method of measurement

| | Method | Unit |
|---|---|---|
| Oxygen permeation rate | ASTM 1434 | ml/m$^2$ · Day · Atm |
| Garley gas permeability | JIS P-8117 | second/100 ml in$^2$, at 25° C. |
| Water vapor permeability | JIS Z-0208 | g/m$^2$ · Day, at 25° C., 50% RH |

Next, the results of Examples 2–10 will be discussed below.

All the permeable diffusing-parcelling materials prepared in Examples 2–10 of this invention had a (water vapor permeability/oxygen permeability) ratio (H$_2$O mg.Atm/O$^2$ ml) of 0.02 or above and 0.3 micron dust capturing efficiency of 50% or above. On the other hand, (water vapor permeability/oxygen permeability) ratio and 0.3 micron dust capturing efficiency of the permeable diffusing-parcelling materials produced in Comparative Examples 1–5 were all smaller than 0.02 and smaller than 50%, respectively.

Although an oxygen permeable resin layer was coated onto a paper in Comparative Examples 3 and 4, no adhesive was coated in these examples, and therefore the effect of this invention was not exhibited.

Examples 11–20: Production of Inhibitor Composition, Production of Inhibitor Parcel and Performances of Inhibitor Parcel Production of Composition 1 and production of inhibitor parcel One gram of ferrate of soybean oil fatty acid, 0.5 g of slaked lime and 1 g. of powdery active charcoal were uniformly mixed together by means of a cutter mixer. When the mixture was allowed to stand at 25° C. for 10 minutes, it turned to a solid mass. By pulverizing the mass, Composition 1 was obtained. Composition 1 was sealed with each of the permeable diffusing-parcelling materials produced in Examples 1–9 by the use of a 3-way sealing machine together with 2.5 g of magnesium oxide, so that the low softening point resin layer of the parcelling material came inside and the parcel came to have a size of 70×70 mm.

Production of Composition 2 and production of parcel

One gram of ferrate of soybean oil fatty acid, 0.5 g of slaked lime, 1 g of powdery active charcoal and 0.6 g of low molecular weight polyethylene wax (171P, manufactured by Sanyo Kasei K. K., softening point 105° C.) were uniformly mixed together by means of a cutter mixer. When the mixture was allowed to stand at 25° C. for 10 minutes, it turned to a solid mass. By pulverizing the mass, Composition 2 was obtained. Composition 2 was parcelled with each of the permeable diffusing-parcelling materials produced in Examples 1–9 by means of a 3-way sealing machine together with 2.5 g of magnesium oxide, so that the low softening point resin layer came inside and the parcel came to have a size of 70×70 mm.

The parcels prepared above were examined on properties and performances. The results are summarized in Table 2.

1. Number of dusts generated from parcel

One parcel was beaten at a rate of 3 times/second in clean air flowing at a flow rate of 3 liters/minute, and number of the dusts generated was counted with a counter (MODEL 208L, manufactured by Met One Co.).

2. Oxygen absorbing rate

One parcel was tightly sealed into a 200×250 mm bag made of polyvinylidene chloride coated stretched nylon (12 microns)/polyethylene (50 microns) together with 250 ml of air, and preserved at 25° C. Oxygen concentration in the bag was followed with time.

3. Heat generation upon standing in atmospheric air

One hundred parcels were wrapped in absorbent cotton and allowed to stand at 35° C. Temperature of the parcels was followed with time, and the maximum temperature was determined.

Comparative Examples 6–10

The procedure of Examples 11–20 was repeated, except that parcels packaged with the permeable diffusing-parcelling materials obtained in Examples 11–20 were replaced with parcels packaged with the permeable diffusing-parcelling material obtained in Comparative Examples 1–5. Number of dusts generated from parcel, oxygen absorbing rate and heat generation upon standing in atmospheric air were measured, and the results are shown in Table 2.

TABLE 2

| | Permeable diffusing-parcelling material | Composition | Change of oxygen concentration in bag with time (%) | | | | | Temperature of parcel standing in atmospheric air (°C.) | No. of dusts emitted from parcel upon vibration (× 10$^4$) |
|---|---|---|---|---|---|---|---|---|---|
| | | | 5 Hrs | 10 Hrs | 24 Hrs | 36 Hrs | 48 Hrs | | |
| Example 11 | Example 2 | 1 | 13 | 6 | 1 | 0 | 0 | 75 | 8 |

TABLE 2-continued

| | Permeable diffusing-parcelling material | Composition | Change of oxygen concentration in bag with time (%) | | | | | Temperature of parcel standing in atmospheric air (°C.) | No. of dusts emitted from parcel upon vibration (× 10⁴) |
|---|---|---|---|---|---|---|---|---|---|
| | | | 5 Hrs | 10 Hrs | 24 Hrs | 36 Hrs | 48 Hrs | | |
| 12 | 3 | 1 | 16 | 11 | 4 | 1 | 0 | 61 | 8 |
| 13 | 4 | 1 | 18 | 15 | 9 | 3 | 0 | 57 | 9 |
| 14 | 5 | 1 | 17 | 14 | 6 | 2 | 0 | 60 | 7 |
| 15 | 6 | 1 | 8 | 3 | 0 | 0 | 0 | 100 | 9 |
| 16 | 7 | 1 | 14 | 12 | 5 | 1 | 0 | 71 | 8 |
| 17 | 8 | 1 | 8 | 3 | 0 | 0 | 0 | 175 | 9 |
| 18 | 9 | 1 | 9 | 4 | 0 | 0 | 0 | 100 | 7 |
| 19 | 10 | 1 | 7 | 3 | 0 | 0 | 0 | 100 | 7 |
| 20 | 8 | 2 | 10 | 5 | 0 | 0 | 0 | 110 | 8 |
| Comparative Example | Comparative Example | | | | | | | | |
| 6 | 1 | 1 | 7 | 2 | 0 | 0 | 0 | >250 | 52 |
| 7 | 2 | 1 | 8 | 3 | 0 | 0 | 0 | 220 | 45 |
| 8 | 3 | 1 | 7 | 3 | 0 | 0 | 0 | 200 | 41 |
| 9 | 4 | 1 | 8 | 2 | 0 | 0 | 0 | 210 | 35 |
| 10 | 5 | 1 | 7 | 2 | 0 | 0 | 0 | >250 | 65 |

The results of Examples 11-20 will be discussed below.

The generation of heat (elevation of temperature) observed when the inhibitor parcels produced in Examples 11-20 of this invention were allowed to stand in the atmospheric air was smaller than that observed when inhibitor parcels of Comparative Examples 6-10 were allowed to stand.

The elevation of temperature was particularly small in Examples 11-14 and 16 where a permeable diffusing-parcelling material having a low oxygen permeability was used. On the other hand, the permeable diffusing-parcelling material used in Example 17 was the same as that used in Example 20, and the parcelling material used therein had a relatively high oxygen permeability. It is apparent that elevation of temperature is smaller in Example 20 than in Example 17, because the inhibitor parcel used in Example 20 contained an anti-exothermic substance. Throughout all the examples and comparative examples, oxygen absorbing function was sufficiently exhibited. The number of dusts generated by vibration of inhibitor parcel was smaller in Examples 11-20 (examples of this invention), while the number was much greater in Comparative Examples 6-10 using usual permeable diffusing-parcelling materials.

This difference in result proves that the permeable diffusing-parcelling material of this invention suppresses the passage of dusts generated from composition, fiber flock, etc.

Examples 21-30

A thin-gage plate of copper alloy (0.027 mm in thickness, 62 mm in width, 160 mm in length) was punched with a press, and its surface was etched with an aqueous solution containing sulfuric acid and hydrogen peroxide. Gold was attached to the IC chip-mounting site of this lead frame, and 50 sheets of such a frame were bundled. Three bundles were prepared in the total. They were wrapped in a polypropylene film and sealed into a polypropylene case (70 mm in width, 200 mm in length, 50 mm in height) together with each of the inhibitor parcels prepared in Examples 10-19. Finally, the whole was tightly sealed into a KON/PE bag (size 170×300 mm). The sealed parcels of lead frame thus obtained were preserved for 24 hours at 25° C. at a relative humidity of 50%, and drop of the oxygen concentration in bag to 0.01% or below was ascertained. Then, the parcels were preserved at 35° C. at a relative humidity of 95%. After preservation, the surface of copper alloy in the lead frame was visually examined. The results are shown in Table 3.

Comparative Examples 11-15

A parcel was sealed and parcelled together with a lead frame in the same manner as in Examples 21-30, except that the inhibitor parcels of Examples 21-30 were replaced with the parcels of Comparative Examples 6-10. They were preserved in the same manner as in Examples 21-30, and the surface of copper alloy of lead frame was visually examined. The results are shown in Table 3.

Comparative Example 16

A parcel was sealed and packaged together with a lead frame in the same manner as in Examples 21-30, except that the inhibitor parcels of Examples 21-30 were replaced with a parcel prepared by packaging 2.5 g of silica gel into the permeable parcelling material of Comparative Example 1. They were preserved in the same manner as in Examples 21-30, and the surface of copper alloy of lead frame was visually examined. The results are shown in Table 3.

Comparative Example 17

A lead frame was parcelled and preserved in the same manner as in Examples 21-30, except that, in the sealing work of Comparative Example 16 into KON/PE bag, the air in the bag was previously replaced with nitrogen until oxygen concentration in the bag reached 0.7%. After preservation, appearance of the surface of copper alloy of lead frame and the state of adhesion of dusts were visually examine by the use of a magnifying lens. The results are shown in Table 3.

TABLE 3

| | Permeable diffusing-parcelling material | Composition | Rust formation*1 | | | | | No. of dusts adherent to copper surface |
| --- | --- | --- | --- | --- | --- | --- | --- | --- |
| | | | 1st day | 7th day | 12th day | 22nd day | 30th day | |
| Example | Example | | | | | | | |
| 21 | 2 | 1 | — | — | — | — | — | 8 |
| 22 | 3 | 1 | — | — | — | — | — | 7 |
| 23 | 4 | 1 | — | — | — | — | — | 8 |
| 24 | 5 | 1 | — | — | — | — | — | 7 |
| 25 | 6 | 1 | — | — | — | — | — | 10 |
| 26 | 7 | 1 | — | — | — | — | — | 8 |
| 27 | 8 | 1 | — | — | — | — | — | 9 |
| 28 | 9 | 1 | — | — | — | — | — | 7 |
| 29 | 10 | 1 | — | — | — | — | — | 6 |
| 30 | 8 | 2 | — | — | — | — | — | 7 |
| Comparative Example | Comparative Example | | | | | | | |
| 11 | 1 | 1 | ++ | ++ | ++ | ++ | +++ | 30 |
| 12 | 2 | 1 | + | ++ | ++ | ++ | +++ | 61 |
| 13 | 3 | 1 | — | + | ++ | ++ | +++ | 55 |
| 14 | 4 | 1 | — | + | ++ | ++ | +++ | 31 |
| 15 | 5 | 1 | — | + | + | ++ | +++ | 78 |
| 16 | 1 | Silica gel | — | — | + | ++ | +++ | 32 |
| 17 | 1 | Silica gel Replacement with $N_2$ | — | — | + | ++ | +++ | 35 |

(Notes)
*1: Color change on copper alloy surface
− No change in color
+ Slight change in color in small area
++ Slight change in color in more than a half area
+++ Great change in color in more than a half area
++++ Great change in color in nearly whole area The results of Examples 21–30 will be discussed below.

In Examples 21–30 where a lead frame was parcelled together with the inhibitor parcels of this invention produced in Examples 11–20, no rust was formed on the surface of copper alloy.

On the other hand, in Comparative Examples 11–15 where a lead frame was sealed together with an inhibitor parcel using usual permeable diffusing-parcelling material, a color change was observed on the surface of copper alloy of lead frame, and the extent of color change was clearly dependent on the permeable diffusing-parcelling material used in inhibitor parcel. In Comparative Examples 11–15, the color change of lead frame is presumably attributable to harmful substances generated from inhibitor parcel.

In Example 21–30, the number of dusts adhering to the surface of copper alloy of lead frame was very small, demonstrating that the inhibitor parcel of this invention suppresses generation of dusts and dusts are scarcely carried into preservation system under usual conditions of use.

Comparative Examples 16 and 17 disclose a case of using silica gel and a case of replacement with nitrogen, respectively. Though an inhibitory effect was observed in these cases so far as the period of preservation was short, formation of rust was observed after a longterm preservation.

Example 31

A semiconductor device was sealed into a magazine, and tightly sealed into a PON/PE bag (size 220×340 mm) together with each of the inhibitor parcels produced in Examples 11–20. Then, the parcels thus obtained were preserved for 30 days at 35° C. at a relative humidity of 95%. After the preservation, surface of the lead frame of semiconductor showed no change in color. When the lead frame was soldered to a printed base sheet, no peeling took place even if vibration was applied, demonstrating excellency of the bonding.

Comparative Example 18

A parcel was sealed and packaged together with a semiconductor device in the same manner as in Example 31, except that the parcels produced in Examples 11–20 were replaced with the parcels produced in Comparative Examples 6–10. The parcels were preserved in the same manner as in Example 31. After the preservation, a partial color change was observed on the lead frame surface in 4 to 7 among 100 articles. When the semiconductor device was soldered to a printed base sheet, peeling took place in 12 to 25 among 100 articles upon vibration.

Comparative Example 19

A semiconductor device was preserved in the same manner as in Example 21, except that the inhibitor used in Example 31 was replaced with the drier of Comparative Example 16. As the result, a partial color change was observed on the surface of copper alloy of lead frame, in 7 among 100 articles. When the semiconductor device was soldered to printed base sheet, peeling took place in 28 among 100 articles, upon vibration.

Comparative Example 20

A semiconductor device was preserved in the same manner as in Comparative example 19, except that the air in bag was previously replaced with nitrogen gas so that oxygen concentration in bag reached 2.8%. As the result, color change was observed on the surface of copper alloy of lead frame, in 19 among 100 articles. When the semiconductor device was soldered to a printed base sheet, peeling took place in 18 among 100 articles, upon vibration.

That is, by using the inhibitor parcel of this invention for preservation of semiconductor devices, rust is prevented and no dust is carried into the preservation system, owing to which soldering of device to printed base sheet can be satisfactorily practised even after preservation and, even if a vibration is applied, no peeling is observed in the bonded part. Thus, the results of Example 31 and Comparative Examples 18-20 prove the usefulness of the inhibitor parcel of this invention.

Owing to the adoption of the above-mentioned construction, this invention has the following effects:

(1) it can remove the moisture in preservation system as rapidly as possible, and by removal of moisture it achieves a perfect inhibition; and (2) since it brings out neither fiber flocks nor fine dusts generated from inhibitor composition onto the surface of inhibitor parcel, it can provide a dust-free preservation system.

The inhibitor parcel of this invention is successfully usable for preservation of electronic devices and electronic parts and particularly semiconductor devices and semiconductor parts.

When moisture must be eliminated more exhaustively in this invention, a sheet-form drier of this invention free from generation of fine powder can be used in combination.

If desired, an anti-exothermic substance of this invention may be added to the inhibitor composition, whereby the violent generation of heat from the inhibitor parcel before or after its use, particularly after use, can be suppressed, even if the parcel is left standing in the atmospheric air.

What is claimed is:

1. An inhibitor parcel comprising
   (a) a composition comprising an unsaturated fatty acid compound as its main ingredient sealed between two sheets of
   (b) a permeable diffusing-parcelling material, said diffusing-parcelling material being prepared by
      (i) providing a base sheet made of a plurality of fibers bonded together by an adhesive or a base sheet made of a fibrous material which has been coated with an adhesive coating,
      (ii) laminating an oxygen permeable resin layer onto a first, exterior side of said base sheet, said oxygen permeable resin layer comprising at least one member selected from the group consisting of silicon resin, polyethylene resin, ethylene-vinyl acetate copolymer, natural rubber, synthetic rubber, cellulose and cellulose compounds,
      (iii) laminating a porous film of low softening point resin or a low softening point nonwoven fabric onto a second, interior side of said base sheet,
      with the proviso that said permeable diffusing-parcelling material (b) has an oxygen permeability of $10^4$ to $10^6$ ml/m$^2$.Atm.day and a water vapor permeability/oxygen permeability ratio of at least 0.02 H$_2$O mg. Atm/O$_2$ ml at 25° C. and a relative humidity of 50%, and
      with the proviso that said second, interior side of said base sheet faces toward said composition (a), and said first, exterior side of said base sheet is opposite said second, interior side of said base sheet,
   wherein said permeable diffusing-parcelling material (b) is made of a material of which said oxygen-permeable resin layer is not perforated.

2. An inhibitor parcel comprising
   (a) a composition comprising an unsaturated fatty acid compound as its main ingredient sealed between two sheets of
   (b) a permeable diffusing-parcelling material, said diffusing-parcelling material being prepared by
      (i) providing a base sheet made of a plurality of fibers bonded together by an adhesive or a base sheet made of a fibrous material which has been coated with an adhesive coating,
      (ii) laminating an oxygen permeable resin layer onto a first, exterior side of said base sheet, said oxygen permeable resin layer comprising at least one member selected from the group consisting of silicon resin, polyethylene resin, ethylene-vinyl acetate copolymer, natural rubber, synthetic rubber, cellulose and cellulose compounds,
      (iii) laminating a porous film of low softening point resin or a low softening point nonwoven fabric onto a second, interior side of said base sheet,
      with the proviso that said permeable diffusing-parcelling material (b) has an oxygen permeability of $10^4$ to $10^6$ ml/m$^2$.Atm.day and a water vapor permeability/oxygen permeability ratio of at least 0.02 H$_2$O mg.Atm/O$_2$ ml at 25° C. and a relative humidity of 50%, and
      with the proviso that said second, interior side of said base sheet faces toward said composition (a), and said first, exterior side of said base sheet is opposite said second, interior side of said base sheet.

3. A parcel according to claim 2, wherein said base sheet is made of a fibrous material coated with an adhesive comprising clay, polyvinyl alcohol and rubber.

4. A parcel according to claim 2, wherein said permeable diffusing-parcelling material (b) is constituted of a material prepared by laminating a layer of silicone resin, polyethylene resin, ethylene-vinyl acetate copolymer, natural rubber, synthetic rubber, cellulose or cellulose compound onto one side of a base sheet made of a fibrous material and an adhesive and laminating a sheet of reinforcing material and a porous film of a low softening point resin or a low softening point nonwoven fabric onto the other side of the base sheet, wherein said porous film is exposed.

5. A parcel according to claim 2, wherein said adhesive is at least one member selected from the group consisting of natural rubber, butadiene-styrene rubber, chloroprene, acrylic ester polymers, polyvinyl acetate, polyvinyl alcohol, cellulose and compounds thereof.

6. A parcel according to claim 2, wherein said composition (a) comprising an unsaturated fatty acid compound as its main ingredient contains, in addition to the unsaturated fatty acid compound a transition metal compound, and at least one member selected from the group consisting of basic substances and adsorbent substances.

7. A parcel according to claim 2, wherein said composition (a) comprising an unsaturated fatty acid compound as its main ingredient, contains a substance which is a solid substance over the whole temperature range not lower than 10° C. and not higher than 50° C. and liquefies to exhibit a fluidity at a temperature selected from the temperature range of 50° C. to 230° C.

8. A parcelled article, comprising a container having a gas barrier property and, sealed within said container, at least one electronic part together with at least one inhibitor parcel, comprising (a) a composition comprising an unsaturated fatty acid compound as its main ingredient sealed between two sheets of (b) a permeable diffusing-parcelling material, said diffusing-parcelling material being prepared by (i) providing a base sheet made of a plurality of fibers bonded together with an adhesive or a base sheet made of a fibrous material which has been coated with an adhesive coating, (ii) laminating an oxygen permeable resin layer onto a first, exterior side of said base sheet, said oxygen permeable resin layer comprising at least one member selected from the group consisting of silicon resin, polyethylene resin, ethylene-vinyl acetate copolymer, natural rubber, synthetic rubber, cellulose and cellulose compounds, (iii) laminating a porous film of low softening point resin or a low softening point nonwoven fabric onto a second, interior side of said base sheet, and with the proviso that said permeable diffusing-parcelling material (b) has an oxygen permeability of $10^4$ to $10^6$ ml/m$^2$.Atm day and a water vapor permeability/oxygen permeability ratio of at least 0.02 H$_2$O mg.Atm/O$^2$ ml at 25° C. and a relative humidity of 50%, and with the proviso that said second, interior side of said base sheet faces toward said composition (a), and said first, exterior side of said base sheet is opposite said second, exterior side of said base sheet.

9. An inhibitor parcel comprising (a) a composition comprising an unsaturated fatty acid compound as its main ingredient sealed between two sheets of (b) a permeable diffusing-parcelling material, said diffusing-parcelling material being prepared by (i) providing a base sheet made of a plurality of fibers bonded together by an adhesive or a base sheet made of a fibrous material which has been coated with an adhesive coating, (ii) laminating an oxygen permeable resin layer onto a first, exterior side of said base sheet, said oxygen permeable resin layer comprising at least one member selected from the group consisting of silicon resin, polyethylene resin, ethylene-vinyl acetate copolymer, natural rubber, synthetic rubber, cellulose and cellulose compounds, (iii) laminating a porous film of low softening point resin or a low softening point nonwoven fabric onto a second, interior side of said base sheet, with the proviso that said permeable diffusing-parcelling material (b) has an oxygen permeability of $10^4$ to $10^6$ ml/m$^2$.Atm.day and a water vapor permeability/oxygen permeability ratio of at least 0.02 H$_2$O mg.Atm/O$^2$ ml at 25° C. and a relative humidity of 50%, and with the proviso that said second, interior side of said base sheet faces toward said composition (a), and said first, exterior side of said base sheet is opposite said second, interior side of said base sheet, wherein said permeable diffusing-parcelling material (b) has a 0.3 micron or more dust-capturing efficiency of 50% or above.

* * * * *